United States Patent
Mori et al.

(10) Patent No.: US 10,976,024 B2
(45) Date of Patent: Apr. 13, 2021

(54) LASER LIGHT SOURCE DEVICE WITH STEP MIRRORS

(71) Applicant: Panasonic Intellectual Property Management Co., Ltd., Osaka (JP)

(72) Inventors: Shigeyuki Mori, Osaka (JP); Masahiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/899,071

(22) Filed: Jun. 11, 2020

(65) Prior Publication Data

US 2020/0400277 A1     Dec. 24, 2020

(30) Foreign Application Priority Data

Jun. 18, 2019   (JP) .............................. JP2019-112922

(51) Int. Cl.
*F21K 9/68* (2016.01)
*F21K 9/69* (2016.01)
(Continued)

(52) U.S. Cl.
CPC .............. *F21V 7/0083* (2013.01); *F21K 9/61* (2016.08); *F21K 9/68* (2016.08); *F21K 9/69* (2016.08);
(Continued)

(58) Field of Classification Search
CPC ..... F21K 9/61; F21K 9/68; F21K 9/69; F21V 7/0083; F21V 7/048; G02B 19/0061; G02B 27/0977
See application file for complete search history.

(56) References Cited

U.S. PATENT DOCUMENTS

2003/0151820 A1* 8/2003 Gao ..................... G02B 27/095
                                                       359/618
2004/0257661 A1* 12/2004 Gao ................... G02B 27/0977
                                                       359/627
(Continued)

FOREIGN PATENT DOCUMENTS

JP        2004-096092        3/2004
JP        2011-066339        3/2011
(Continued)

*Primary Examiner* — Evan P Dzierzynski
*Assistant Examiner* — Keith G. Delahoussaye
(74) *Attorney, Agent, or Firm* — McDermott Will and Emery LLP (57) ABSTRACT

A light source device according to the present disclosure includes a light source unit, a collimator, a first step mirror, a second step mirror, a condenser lens, and an optical fiber. The first step mirror reduces a plurality of parallel beams in a row direction by narrowing a column interval between the plurality of parallel beams. The second step mirror reduces the plurality of parallel beams in the column direction by narrowing a row interval between the plurality of parallel beams. The number of steps of the first step mirror and the number of steps of the second step mirror are different from each other, and a width of each of the plurality of mirror surfaces of the first step mirror and a width of each of the plurality of mirror surfaces of the second step mirror are different from each other.

11 Claims, 6 Drawing Sheets

(51) Int. Cl.
- *F21V 7/00* (2006.01)
- *G02B 19/00* (2006.01)
- *F21K 9/61* (2016.01)
- *F21V 7/04* (2006.01)
- *G02B 27/09* (2006.01)

(52) U.S. Cl.
CPC ............ *F21V 7/0066* (2013.01); *F21V 7/048* (2013.01); *G02B 19/0057* (2013.01); *G02B 27/0977* (2013.01)

(56) References Cited

U.S. PATENT DOCUMENTS

| | | | |
|---|---|---|---|
| 2005/0063435 A1 | 3/2005 | Imai et al. | |
| 2011/0069968 A1 | 3/2011 | Tanaka | |
| 2017/0138545 A1* | 5/2017 | Minor | ............... F21V 29/90 |
| 2017/0292679 A1* | 10/2017 | Saikawa | ............. G02B 27/106 |

FOREIGN PATENT DOCUMENTS

| | | |
|---|---|---|
| JP | 2011-076781 | 4/2011 |
| JP | 2013-072942 | 4/2013 |
| JP | 2014-142369 | 8/2014 |

\* cited by examiner

LASER LIGHT SOURCE DEVICE WITH STEP MIRRORS

BACKGROUND

1. Technical Field

The present disclosure relates to a light source device, and more particularly, to a light source device such as a laser oscillator using a plurality of laser diodes (LDs) as a light source.

2. Description of the Related Art

Figure 5:
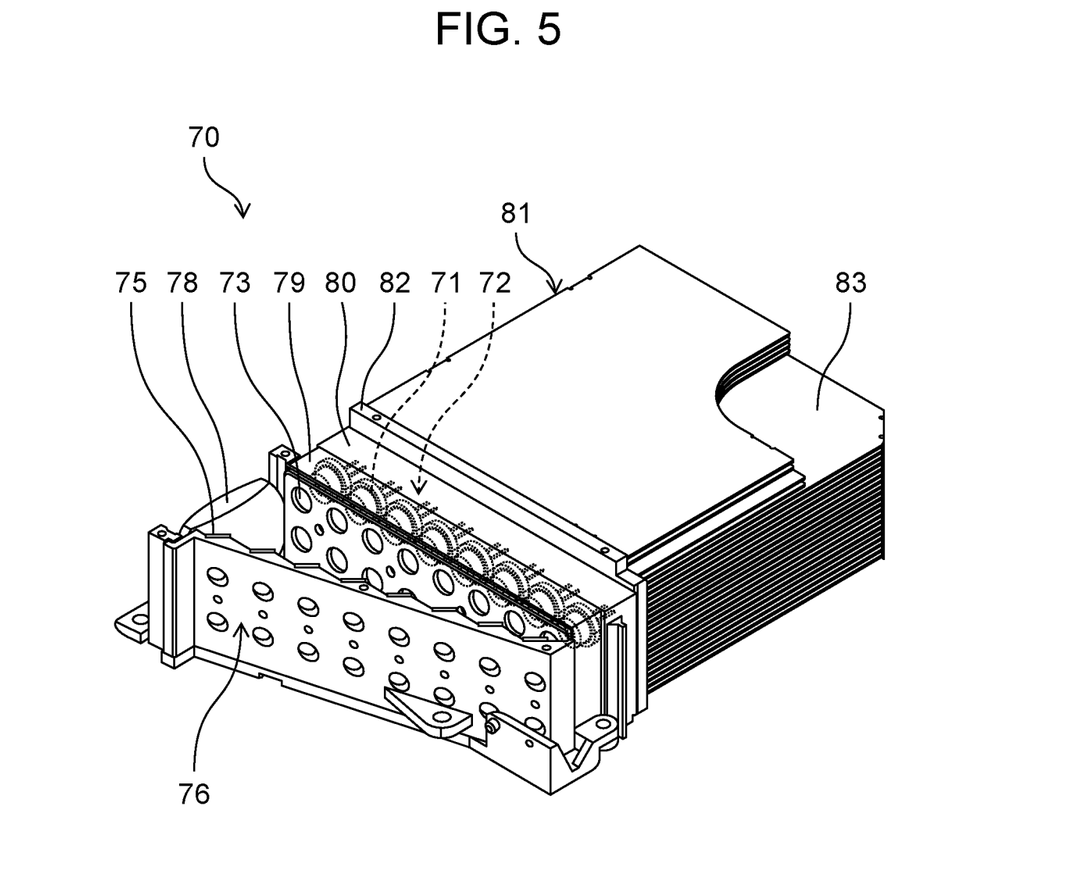
FIG. 5 is a schematic view of a light source device according to the related art.

In a light source device according to the related art, as disclosed in Japanese Patent Unexamined Publication No. 2011-76781, in order to integrate more light, a light source light flux arranged in a row direction and a column direction is reduced in the row direction by a step-like mirror. FIG. 5 is a schematic view of a light source device according to the related art disclosed in Japanese Patent Unexamined Publication No. 2011-76781.

In FIG. 5, a light beam emitted from light source 71 is converted into a parallel beam by collimator lens 73 disposed to correspond to light source 71. In order to reduce a column interval between light source light fluxes of light source group 72 which becomes a parallel beam, reflective mirror 75 is disposed on an optical axis of each light source 71. Reflective mirror 75 is held by a step-like mirror holder in order to reduce a bundle of light beams emitted from light source group 72 in the row direction.

SUMMARY

A light source device according to the present disclosure includes a light source unit, a collimator, a first step mirror, a second step mirror, a condenser lens, and an optical fiber.

The light source unit has a plurality of laser diodes arranged in a row direction and a column direction intersecting the row direction.

The collimator has a plurality of collimator lenses arranged to correspond to the plurality of laser diodes such that a plurality of beams emitted from the plurality of laser diodes are parallel to each other.

The first step mirror has a plurality of mirror surfaces that are arranged on optical axes of the plurality of parallel beams parallelized by the collimator, and reduce the plurality of parallel beams in a row direction by narrowing a column interval of the plurality of parallel beams to reflect the plurality of parallel beams.

The second step mirror has a plurality of mirror surfaces that are arranged on the optical axes of the plurality of parallel beams, and reduces the plurality of parallel beams in the column direction by narrowing a row interval of the plurality of parallel beams to reflect the plurality of parallel beams.

The condenser lens condenses the plurality of parallel beams reduced in the row direction and the column direction by the first step mirror and the second step mirror.

One end of the optical fiber is disposed at a focal point of the condenser lens in order to extract a beam condensed by the condenser lens.

The number of steps of the first step mirror and the number of steps of the second step mirror are different from each other, and a width of each of the plurality of mirror surfaces of the first step mirror and a width of each of the plurality of mirror surfaces of the second step mirror are different from each other.

DETAILED DESCRIPTION

In a configuration of a light source device according to the related art, a light source light flux is integrated in a row direction using one step-like mirror. Here, in order to collect more light, it is necessary to integrate the light in a column direction. However, when a laser diode is used as a light source, the beam has an elliptical shape. Therefore, when the light is converged in the row direction and the column direction simply using two step-like mirrors, in the one step-like mirror, the width of a mirror surface is small with respect to the beam, and thus the beam is exposed. Otherwise, the width of the mirror surface is large with respect to the beam, and thus the convergence may be insufficient.

Figure 2A:
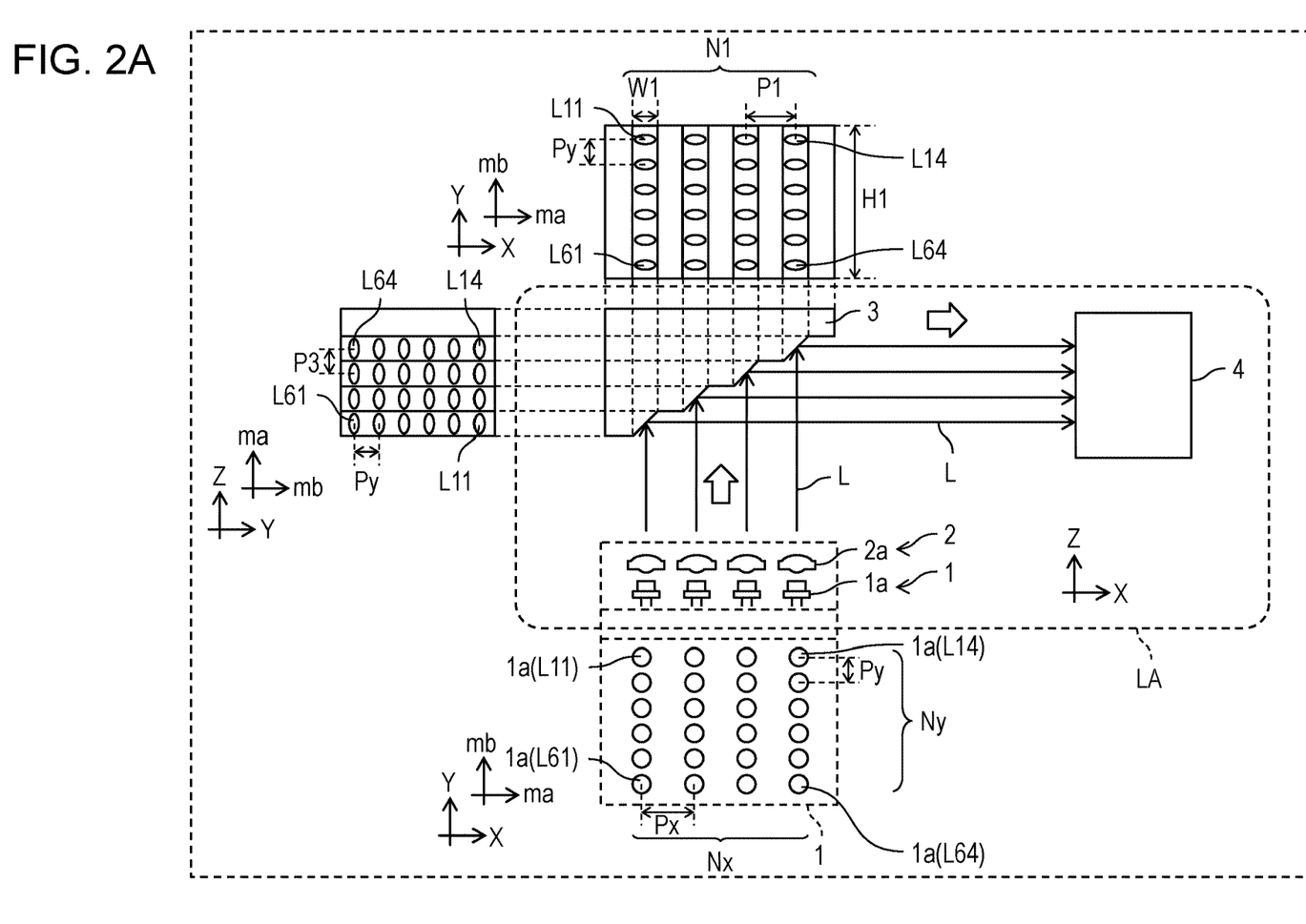
FIG. 2A is a schematic view of a dimension of the light source device according to the exemplary embodiment.
Figure 2B:
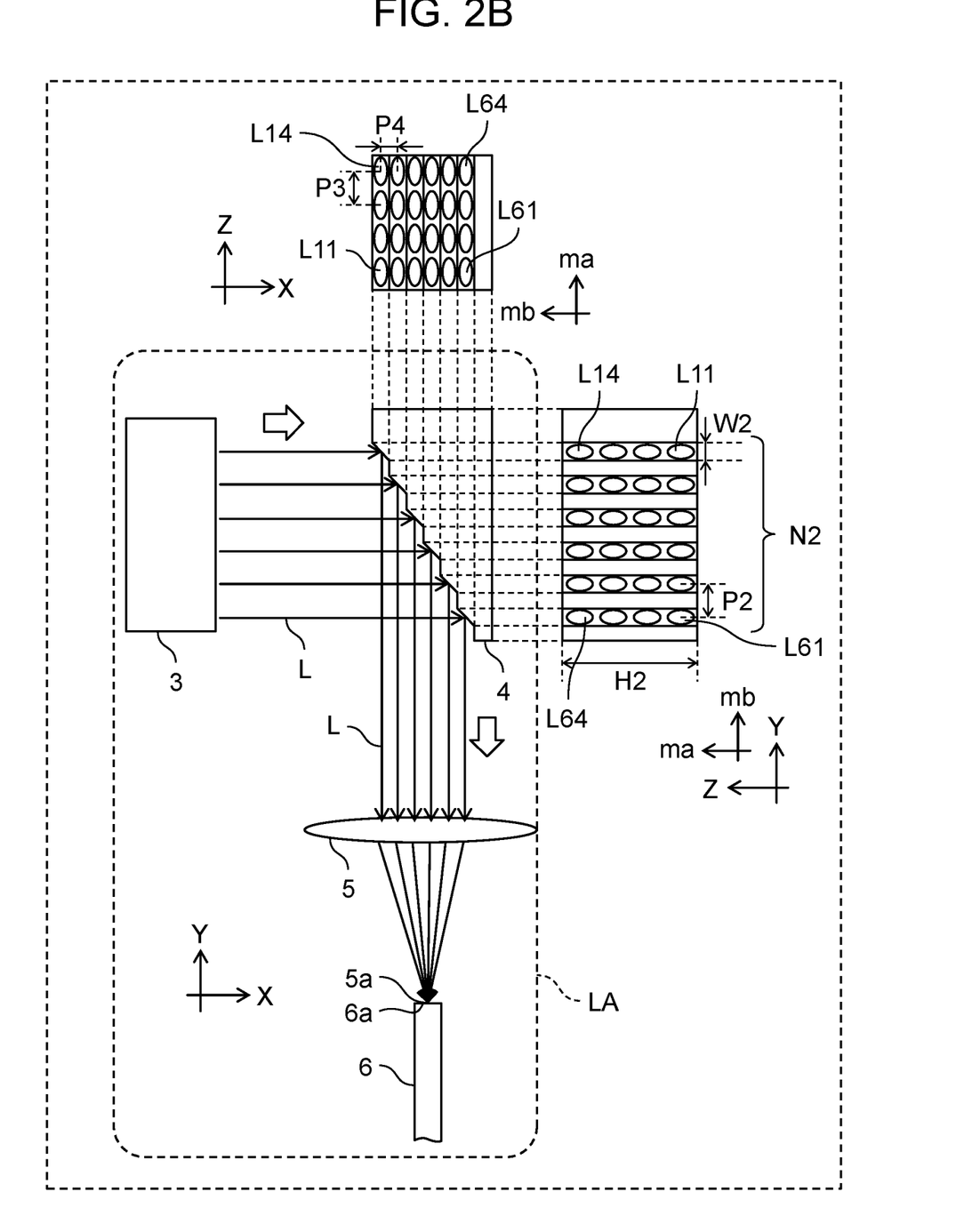
FIG. 2B is a schematic view of a dimension of the light source device according to the exemplary embodiment.

Hereinafter, exemplary embodiments of the present disclosure will be described with reference to the drawings. In each drawing, an XYZ coordinate system illustrates an example of a rectangular coordinate system in light source device LA. Further, a ma and mb coordinate system illustrates an example of a coordinate system of parallel beams L arranged in the row direction and the column direction (FIGS. 2A and 2B). For example, a ma direction is a row direction, and a mb direction is a column direction. Further, the row direction and the column direction serve as a reference of an arrangement direction of laser diode 1a in light source unit 1, the row direction is a direction (transverse direction) in which rows extend, and the column direction is a direction in which columns extend. The row direction and the column direction of parallel beam L change with respect to the XYZ coordinate system due to reflection by first step mirror 3 and second step mirror 4.

Exemplary Embodiment

Figure 1:
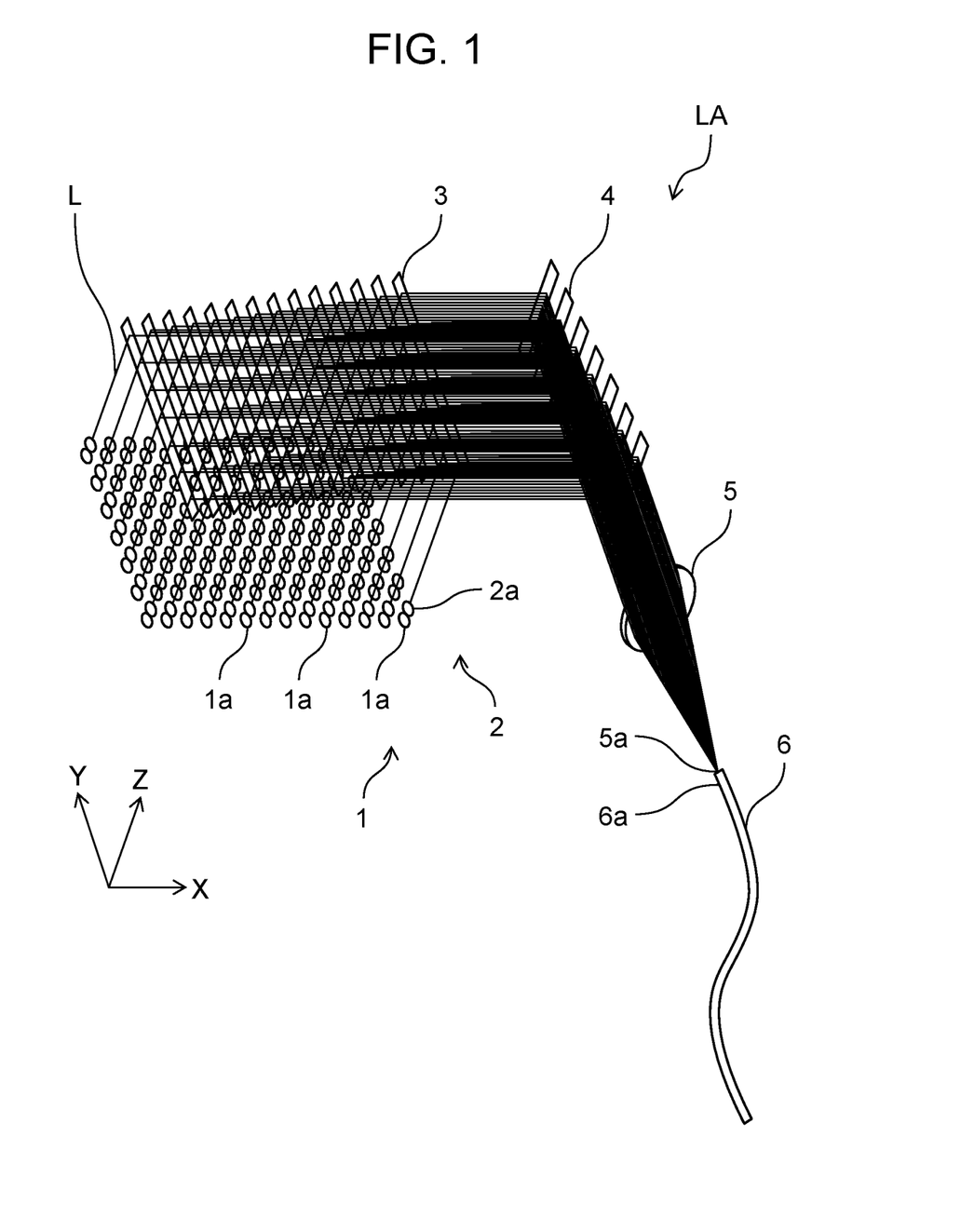
FIG. 1 is a schematic view of a light source device according to an exemplary embodiment.

FIG. 1 is a schematic view of light source device LA according to an exemplary embodiment of the present disclosure. Light source device LA includes light source unit 1, collimator 2, first step mirror 3, second step mirror 4, condenser lens 5, and optical fiber 6.

As illustrated in FIG. 1, light source unit 1 includes plurality of laser diodes (LDs) 1a arranged in the row direction and the column direction intersecting the row direction.

The collimator 2 has plurality of collimator lenses 2a arranged in the row direction and the column direction by the same number as plurality of laser diodes 1a. That is, plurality of collimator lenses 2a are arranged to correspond to plurality of laser diodes 1a. Collimator lenses 2a are arranged such that beams emitted from corresponding laser diodes 1a become parallel light, respectively.

Parallel beam L is a parallel beam emitted from laser diodes 1a and formed through corresponding collimator lenses 2a.

Plurality of parallel beams L passing through plurality of collimator lenses 2a arranged in the row direction and the column direction are reduced in the row direction by first step mirror 3 and are further reduced in the column direction by second step mirror 4. Parallel beams L reduced in the row direction and the column direction is condensed by condenser lens 5 at focal point 5a of condenser lens 5. One end 6a of optical fiber 6 is disposed at focal point 5a of condenser lens 5 in order to extract a beam condensed by condenser lens 5. Accordingly, parallel beams L are condensed at end 6a of optical fiber 6 and propagates through optical fiber 6.

First step mirror 3 and second step mirror 4 are formed by processing a member such as aluminum such that the mirror surface is arranged in a step shape.

Figure 3:
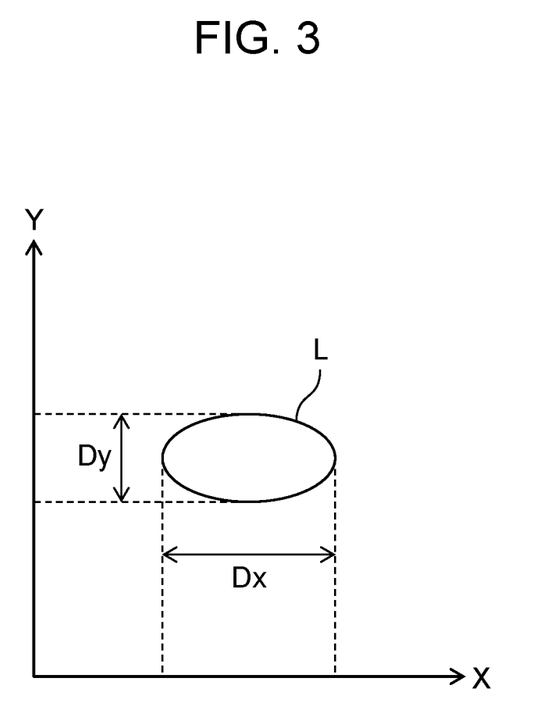
FIG. 3 is a cross-sectional view of a parallel laser beam according to the exemplary embodiment.

FIGS. 2A and 2B are schematic views of dimensions of light source device LA in the exemplary embodiment. In FIGS. 2A and 2B, as illustrated in FIG. 3, parallel beam L has a half value beam diameter Dx of parallel beam L in the row direction and a half value beam diameter Dy of parallel beam L in the column direction. Laser diode 1a and collimator lens 2a are arranged in the row direction at arrangement interval Px and are arranged in the column direction at arrangement interval Py.

In FIG. 2A, reference numeral Nx denotes the number of laser diodes 1a and collimator lenses 2a arranged in the row direction. Reference numeral Ny denotes the number of laser diodes 1a and collimator lenses 2a arranged in the column direction. In FIG. 2A, as an example, the arrangement in FIG. 1 is simplified, and laser diodes 1a and collimator lenses 2a are arranged in a matrix having 6 rows and 4 columns. For example, parallel beam L11 is emitted from laser diode 1a arranged in a first row and a first column. Parallel beam L61 is emitted from laser diode 1a arranged in a sixth row and the first column. Parallel beam L14 is emitted from laser diode 1a arranged in the first row and a fourth column. Parallel beam L64 is emitted from laser diode 1a arranged in the sixth row and the fourth column.

First step mirror 3 has length (width) W1 of the mirror in a short-side direction and length (height) H1 of the mirror in a longitudinal direction. Reference numeral P1 denotes an arrangement interval of a mirror surface of first step mirror 3, reference numeral P3 denotes a step interval of the mirror of first step mirror 3, and reference numeral N1 denotes the number of mirror steps of first step mirror 3. First step mirror 3 is arranged on an optical axes of plurality of parallel beams L converted into parallel light by plurality of collimators 2 and reduces a column interval between plurality of parallel beams L, thereby reducing and reflecting plurality of parallel beams L from plurality of collimators 2 in the row direction.

In FIG. 2B, second step mirror 4 has length (width) W2 of the mirror in the short-side direction and length (height) H2 of the mirror in the longitudinal direction. Reference numeral P2 denotes an arrangement interval of a mirror surface of second step mirror 4, reference numeral P4 denotes a step interval of a mirror of second step mirror 4, and reference numeral N2 denotes the number of mirror steps of second step mirror 4. Second step mirror 4 is arranged on an optical axes of plurality of parallel beams L and reduces a row interval between plurality of parallel beams L, thereby reducing and reflecting plurality of parallel beams L from plurality of collimators 2 via first step mirror 3 in the column direction.

At this time, in order that integration of parallel beams L is not insufficient, plurality of relational equations need to be satisfied. For example, width W1 of the mirror surface of first step mirror 3 depends on half value beam diameter Dx which is the width of the parallel beams L in the transverse direction (row direction). Width W2 of the mirror surface of second step mirror 4 depends on half value beam diameter Dy which is the width of parallel beams L in a vertical direction (column direction). Further, number N1 of mirror steps of first step mirror 3 and number N2 of mirror steps of second step mirror 4 depend on the number of arrays of laser diodes 1a. Further, height H1 of the mirror surface of first step mirror 3 and height H2 of the mirror surface of second step mirror 4 depend on an arrangement interval and the number of arrays of laser diodes 1a and half value beam diameters Dx and Dy that are the widths of parallel beams L in the transverse direction and the vertical direction. Hereinafter, the respective relational equations will be described.

The following relational equation needs to be satisfied between number N1 of mirror steps of first step mirror 3 and number Nx of arrays of laser diode 1a and collimator lens 2a in the row direction.

$$N1 \geq Nx \quad (1)$$

When Equation (1) is not satisfied, number N1 of mirror steps of first step mirror 3 is insufficient, and entire parallel beams L arranged in the row direction are reflected by first step mirror 3 and cannot be directed to second step mirror 4.

The following relational equation needs to be satisfied between arrangement interval P1 of the mirror surface of first step mirror 3 and arrangement interval Px between laser diode 1a and collimator lens 2a in the row direction.

$$P1 = Px \quad (2)$$

That is, arrangement interval P1 of the mirror surface of first step mirror 3 is the same as arrangement interval Px of laser diodes 1a in the row direction.

When Equation (2) is not satisfied, the center of the optical axis of parallel beams L arranged in the row direction cannot be reflected at the center of the mirror surface of first step mirror 3 in the width direction, and a component that cannot perform the reflection increases.

The following relational equation needs to be satisfied between width W1 of the mirror surface of first step mirror 3 and half value beam diameter Dx of parallel beams L in the row direction.

$$Dx \times 0.5 \leq W1 \leq Dx \times 1.4 \quad (3)$$

That is, width W1 of the mirror surface of first step mirror 3 is 50% or more and 140% or less of half value beam diameter Dx of parallel beams L in the row direction.

The beam emitted from laser diode 1a is a Gaussian beam. When the value of width W1 is increased, although output of the parallel beam per laser diode that can be reflected is increased, since a degree of reduction of the beams arranged in the row direction is reduced to that extent, the effective diameter of condenser lens 5 is not fitted, and it is difficult to obtain a target condensed output.

On the other hand, when width W1 is reduced, the degree of reduction increases and the effective diameter of condenser lens 5 is fitted. However, since a ratio of the outer beam that cannot be reflected by the mirror surface increases, it becomes difficult to obtain the target condensed output. The reason why Equation (3) needs to be satisfied will be further described.

The effective diameter of condenser lens 5 is D1, $$D1 = Dx \times Nx \quad (4)$$

$$W1 = Dx \quad (5)$$

It is assumed that when Equations (4) and (5) are satisfied, if efficiency of the light emitted from optical fiber 6 with respect to the light emitted from laser diode 1a is 70% or more, a target output can be obtained by optical fiber 6.

At this time, when a value of width W1 of the mirror of first step mirror 3 is made larger than half value beam diameter Dx in the row direction, a vignetting component decreases by the mirror, but the beam diameter after integration increases and exceeds D1. Thus, loss when passing through condenser lens 5 increases.

$$W1 = Dx \times 1.4 \quad (6)$$

When Equation (6) is satisfied, the loss increases by 24%.

Further, when the value of width W1 is smaller than half value beam diameter Dx in the row direction, the vignetting component increases by the mirror, so that the loss when passing through first step mirror 3 increases.

$$W1 = Dx \times 0.5 \quad (7)$$

When Equation (7) is satisfied, the loss increases by 27%.

Actually, the beam emitted from the laser diode 1a causes a reflection loss of about 1% on each of the front and rear surfaces of collimator lens 2a and the front and rear surfaces of condenser lens 5. Further, a transmission loss of about 1% occurs on each mirror surface of first step mirror 3 and second step mirror 4. Further, a reflection loss of 1% or more also occurs at the end surface of optical fiber 6.

From the above, when Equations (6) and (7) are satisfied, a total loss exceeds 30%, so that it is practically difficult to actually obtain the above-described target value of output efficiency of 70%. Therefore, Equation (3) needs to be satisfied.

In this case, a configuration is provided such that, when Equation (4) is satisfied, the efficiency required before and after optical fiber 6 to obtain the target output becomes 70%. However, a coefficient related to half value beam diameter Dx in the row direction in Equation (3) may also change according to design matters.

Height H1 of the mirror of first step mirror 3, half value beam diameter Dy of parallel beam L in the column direction, arrangement interval Py in the column direction, and number Ny of arrays should satisfy the following relational equation.

$$H1 \geq Py \times (Ny - 1) + Dy \quad (8)$$

If Equation (8) is not satisfied, all parallel beams L arranged in the column direction cannot be reflected and directed to second step mirror 4. That is, height H1 of the mirror surface of first step mirror 3 is equal to or larger than a numerical value obtained by adding half value beam diameter Dy of parallel beams L in the column direction to a product of arrangement interval Py and a number obtained by subtracting one from number Ny of arrays of laser diode 1a in the column direction.

The following relational equation needs to be satisfied between step interval P3 between the mirrors of first step mirror 3 and arrangement interval P1 of the mirror surface of first step mirror 3.

$$P3 < P1 \quad (8.5)$$

By satisfying Equation (8.5), parallel beams L are integrated in the row direction and directed toward second step mirror 4 when reflected by first step mirror 3.

The following relational equation needs to be satisfied between number N2 of mirror steps of second step mirror 4 and number Ny of arrays of laser diode 1a and collimator lens 2a in the column direction.

$$N2 \geq Ny \quad (9)$$

When Equation (9) is not satisfied, number N2 of mirror steps of second step mirror 4 is insufficient, and all parallel beams L arranged in the column direction cannot be reflected by second step mirror 4 and directed to condenser lens 5. Therefore, number N1 of mirror steps of first step mirror 3 is equal to or larger than number Nx of arrays of laser diodes 1a of light source unit 1 in the row direction, and number N2 of mirror steps of second step mirror 4 is equal to or larger than number Ny of arrays of laser diodes 1a of light source unit 1 in the column direction. Further, since half value beam diameter Dx of parallel beam L in the row direction is different from half value beam diameter Dy of parallel beam L in the column direction, the number of arrays of the mirrors of first step mirror 3 and second step mirror 4 is changed in the row direction and the column direction, so that half value beam diameters Dx and Dy of integrated beams after being integrated by second step mirror 4, in the row direction and the column direction, can be aligned. Therefore, number N1 of mirror steps of the first step mirror is different from number N2 of mirror steps of the second step mirror. When half value beam diameter Dx of the condensed beam in the row direction is equal to half value beam diameter Dy of the condensed beam in the column direction, the integrated beam can be easily condensed on optical fiber 6 by condenser lens 5 having a circular shape. In FIG. 2B, in order to easily understand the vertical and transverse directions of parallel beams L, half value beam diameter Dx in the row direction and half value beam diameter Dy in the column direction are illustrated differently.

The following relational equation needs to be satisfied between arrangement interval P2 of the mirror surface of second step mirror 4 and arrangement interval Py of laser diode 1a and collimator lens 2a in the column direction.

$$P2 = Py \quad (10)$$

That is, arrangement interval P2 of the mirror surfaces of second step mirror 4 is the same as arrangement interval Py of laser diodes 1a in the column direction.

When Equation (10) is not satisfied, the center of the optical axis of parallel beams L arranged in the column direction cannot be reflected at the center of the mirror surface of second step mirror 4 in the width direction, and a component that cannot perform the reflection increases. Arrangement interval P1 of the mirror surface of first step mirror 3 and arrangement interval P2 of the mirror surface of second step mirror 4 are not particularly limited as long as adjacent laser diodes 1a are wide enough not to cause physical interference. When arrangement interval Px of laser diodes 1a in the row direction and arrangement interval Py of laser diodes 1a in the column direction are aligned with each other, a space of light source unit 1 can be saved. Therefore, in this case, it is necessary to align arrangement interval P1 of the mirror surface of first step mirror 3 with arrangement interval P2 of the mirror surface of second step mirror 4.

Since half value beam diameter Dx of parallel beam L in the row direction and half value beam diameter Dy of parallel beam L in the column direction hardly become equal, width W1 of first step mirror 3 and width W2 of second step mirror 4 are almost different from each other. The following relational equation needs to be satisfied between width W2 of the mirror surface of second step mirror 4 and half value beam diameter Dy of parallel beam L in the column direction.

$$Dy \times 0.5 \leq W2 \leq Dy \times 1.4 \quad (11)$$

That is, width W2 of the mirror surface of second step mirror 4 is 50% or more and 140% or less of half value beam diameter Dy of parallel beam L in the row direction. Since width W1 of first step mirror 3 and width W2 of second step mirror 4 are different from each other, an appropriate width can be formed for each of half value beam diameter Dx of parallel beam L in the row direction and half value beam diameter Dy of parallel beam L in the column direction. Accordingly, it is possible to prevent the fact that the width of the mirror surface is small with respect to parallel beam L and parallel beam L protrudes from the mirror surface or the fact that the width of the mirror surface is large with respect to parallel beam L and parallel beam L is insufficiently converged.

As described above, the beam emitted from laser diode 1a is a Gaussian beam. When a value of width W2 increases, output of the parallel beam per laser diode that can be reflected increases. However, a degree of reduction of the beam arranged in the column direction decreases to that extent. Therefore, the effective diameter of condenser lens 5 is not fitted, and it becomes difficult to obtain the target condensed output. On the other hand, when width W2 is reduced, the degree of reduction increases, and the effective diameter of condenser lens 5 is fitted. However, since a ratio of the outer beam that cannot be reflected by the mirror surface increases, it is difficult to obtain the target condensed output.

The reason why Equation (11) needs to be satisfied will be described below.

Assuming effective diameter D1 of condenser lens 5, $$D1 = Dy \times Ny \quad (12)$$

$$W2 = Dy \quad (13)$$

When Equations (12) and (13) are satisfied, if efficiency of the light emitted from optical fiber 6 with respect to the light emitted from laser diode 1a is 70% or more, the target output can be obtained by optical fiber 6.

At this time, when the value of width W2 of the mirror of second step mirror 4 is made larger than half value beam diameter Dy, a vignetting component decreases by the mirror, but a beam diameter after integration increases and exceeds effective diameter D1. Thus, loss when passing through condenser lens 5 increases.

$$W2 = Dy \times 1.4 \quad (14)$$

When Equation (14) is satisfied, the loss increases by 24%.

Further, when the value of width W2 is smaller than half value beam diameter Dy, the vignetting component increases by the mirror, so that the loss when passing through second step mirror 4 increases.

$$W2 = Dy \times 0.5 \quad (15)$$

When Equation (15) is satisfied, the loss increases by 27%.

As described above, when Equations (14) and (15) are satisfied, it is practically difficult to actually obtain the above-described target value of the output efficiency of 70%. Therefore, Equation (11) needs to be satisfied.

In this time, a configuration is provided in which collection efficiency required before and after optical fiber 6 is 70% in order to obtain the target output when Equation (11) is satisfied. However, when the same concept is used, it is not always necessary to satisfy Equation (12) or to obtain a numerical value of 70% of collection efficiency, and a coefficient related to half value beam diameter Dx in Equation (11) may be changed according to design matters.

The following relational equation needs to be satisfied between height H2 of the mirror surface of second step mirror 4, number Nx of arrays of parallel beams L in the row direction, and width W1 of the mirror surface of first step mirror 3.

$$H2 \geq Nx \times W1 \quad (16)$$

If Equation (16) is not satisfied, all parallel beams L arranged in the row direction cannot be reflected and directed to condenser lens 5. That is, height H2 of the mirror surface of second step mirror 4 is equal to or larger than a numerical value of a product of number Nx of arrays of laser diodes D1 in the row direction and width W1 of the mirror surface of first step mirror 3.

Parallel beam L not integrated in the height direction of the mirror surface is incident on first step mirror 3, whereas a beam integrated in the height direction of the mirror surface is incident on second step mirror 4. Therefore, the heights H1 and H2 of the mirror surface of first step mirror 3 and second step mirror 4 are often different from each other. That is, the heights H1 and H2 of the mirror surface of first step mirror 3 and second step mirror 4 are different from each other. By determining an arrangement interval of laser diodes 1a according to the width of parallel beam L and the number of arrays of laser diodes 1a, the heights of the mirror surfaces of respective first step mirror 3 and second step mirror 4 can be aligned with each other.

The following relational equation needs to be satisfied between step interval P4 of the mirror of second step mirror 4 and arrangement interval P2 of the mirror surface of first step mirror 3.

$$P4 < P2 \quad (17)$$

By satisfying Equation (17), parallel beam L is integrated in the column direction and directed toward condenser lens 5 when reflected by second step mirror 4.

In FIG. 2A, although a long axis direction of elliptical parallel beam L is arranged in the row direction, and a short axis direction of elliptical parallel beam L is arranged in the column direction, the long axis direction may be arranged in the column direction. However, when the long axis direction is arranged in the column direction, a ratio of the width to the height of the mirror surface of first step mirror 3 becomes large, and thus it is difficult to guarantee accuracy. Therefore, it is preferable that the long axis direction is arranged in the row direction.

Figure 4A:
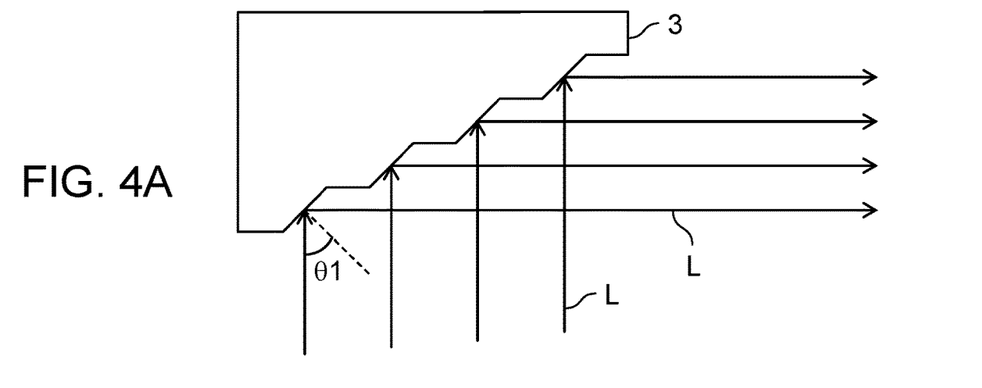
FIG. 4A is a schematic view illustrating a step mirror angle according to the exemplary embodiment.
Figure 4B:
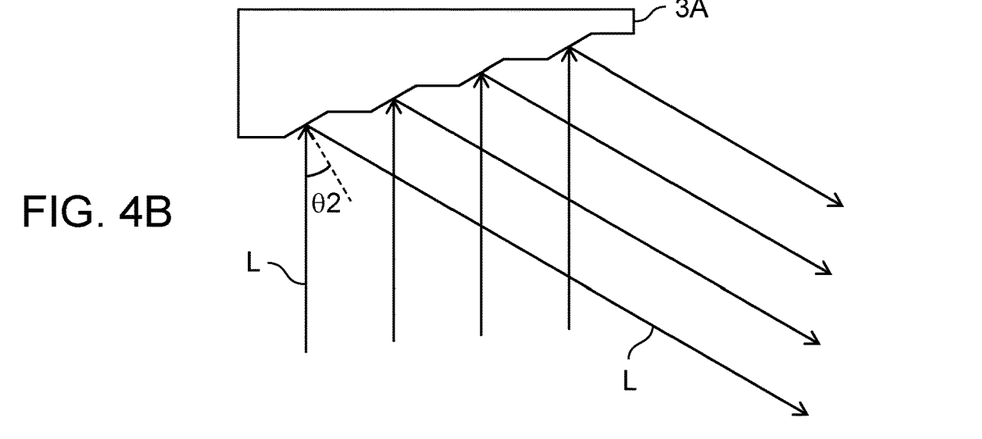
FIG. 4B is a schematic view illustrating a step mirror angle according to a comparative example.
Figure 4C:
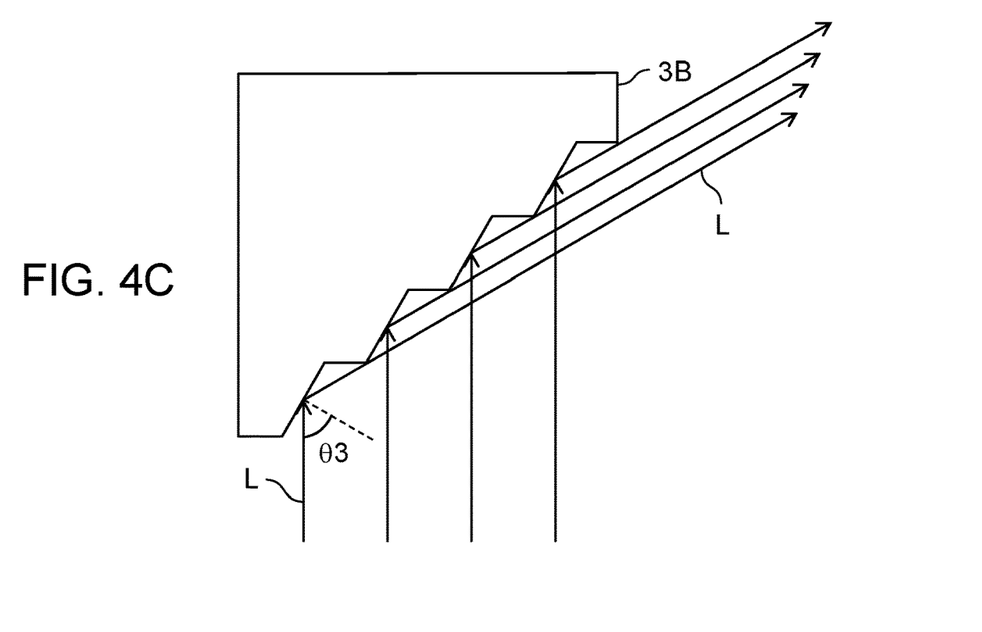
FIG. 4C is a schematic view illustrating a step mirror angle according to a comparative example.

FIG. 4A is a schematic view of a step mirror angle in the exemplary embodiment. FIGS. 4B and 4C are schematic views of a step mirror angle in a comparative example. It is preferable that reflection angle θ1 of first step mirror 3 and second step mirror 4 is 45° as illustrated in FIG. 4A. For example, as illustrated in FIG. 4B, when reflection angle θ2 is less than 45°, an interval between parallel beams L cannot be sufficiently reduced. Further, as illustrated in FIG. 4C, when reflection angle θ3 is larger than 45°, the interval between the parallel beams L is excessively reduced. Further, as reflected parallel beam L collides with a portion other than the mirror surface, the output may be reduced.

It is preferable that a flat portion between the mirror surfaces of first step mirror 3 and second step mirror 4 is not a mirror surface, but is a rough surface that is rougher than the mirror surface. Since the outer beam of parallel beam L corresponds to the flat portion, when the flat portion is the mirror surface, the reflected and returned light may adversely affect laser diode 1a. By making the surface rougher than the mirror surface, irregular reflection occurs, and by diffusing the light, an adverse effect on laser diode 1a can be avoided. Further, even when an absorptive coating or the like other than the rough surface is performed, generation of the returned light can be avoided. However, it is preferable that the mirror surface is rough since the mirror surface may be caught by the coating during a coating process.

As described above, light source device LA according to the exemplary embodiment includes light source unit 1 and collimator 2.

Light source unit 1 has plurality of laser diodes 1a arranged in a row direction and a column direction intersecting the row direction.

Collimator 2 has the same number of collimator lenses 2a as laser diodes 1a arranged such that beams emitted from respective laser diodes 1a become parallel light.

Further, light source device LA has first step mirror 3 and second step mirror 4.

The first step mirror 3 is disposed on optical axes of plurality of parallel beams L that have been converted into parallel light by collimator 2 and reduces a column interval of plurality of parallel beams L, thereby reducing and reflecting plurality of parallel beams L from collimator 2 in the row direction.

Second step mirror 4 is disposed on the optical axes of plurality of parallel beams L, and reduces and reflects parallel beam L from collimator 2 in the column direction by reducing the row interval between plurality of parallel beams L.

Further, light source device LA includes condenser lens 5 and optical fiber 6.

Condenser lens 5 condenses beams reduced in the row direction and the column direction by first step mirror 3 and second step mirror 4.

One end 6a of optical fiber 6 is disposed at focal point 5a of condenser lens 5 in order to extract a beam condensed by condenser lens 5.

Number N1 of steps of first step mirror 3 and number N2 of steps of second step mirror 4 are different from each other, and width W1 of the mirror surface of first step mirror 3 and width W2 of the mirror surface of second step mirror 4 are different from each other.

According to light source device LA according to the exemplary embodiment, number Ni of steps of first step mirror 3 and number N2 of steps of second step mirror 4 are different from each other, and width W1 of the mirror surface of first step mirror 3 and width W2 of the mirror surface of second step mirror 4 are different from each other. Accordingly, beam L emitted from light source unit 1 and converted into parallel light by collimator 2 can be efficiently integrated in the row direction, and can be then further integrated in the column direction. As a result, it is possible to provide light source device LA that can collect more light emitted from laser diode 1a at the end 6a of optical fiber 6 by condenser lens 5.

As described above, according to the light source device of the present disclosure, more light can be converged.

The light source device of the present disclosure can integrate beams of a larger number of laser diode than in the related art, and can be applied to applications such as a processing laser oscillator requiring a high output such as a direct diode laser.

What is claimed is:

1. A light source device comprising:
   a light source unit that has a plurality of laser diodes arranged in a row direction and a column direction intersecting the row direction;
   a collimator that has a plurality of collimator lenses arranged to correspond to the plurality of laser diodes, the collimator parallelizing a plurality of beams emitted from the plurality of laser diodes;
   a first step mirror that has a plurality of mirror surfaces which are arranged on optical axes of a plurality of parallel beams parallelized by the collimator and reduces the plurality of parallel beams in the row direction by narrowing a column interval of the plurality of parallel beams to reflect the plurality of parallel beams;
   a second step mirror that has a plurality of mirror surfaces arranged on the optical axes of the plurality of parallel beams, and reduces the plurality of parallel beams in the column direction by narrowing a row interval of the plurality of parallel beams to reflect the plurality of parallel beams;
   a condenser lens that condenses the plurality of parallel beams reduced in the row direction and the column direction by the first step mirror and the second step mirror; and
   an optical fiber having one end disposed at a focal point of the condenser lens to extract a beam condensed by the condenser lens, wherein
   the number of steps of the first step mirror and the number of steps of the second step mirror are different from each other, and
   a width of each of the plurality of mirror surfaces of the first step mirror and a width of each of the plurality of mirror surfaces of the second step mirror are different from each other.

2. The light source device of claim 1, wherein
   a length of the first step mirror in a longitudinal direction and a length of the second step mirror in a longitudinal direction are different from each other.

3. The light source device of claim 1, wherein
   an arrangement interval of the plurality of mirror surfaces of the first step mirror and an arrangement interval of the plurality of mirror surfaces of the second step mirror are different from each other.

4. The light source device of claim 1, wherein
   the number of steps of the first step mirror is equal to or larger than the number of arrays of the plurality of laser diodes in the row direction, and
   the number of steps of the second step mirror is equal to or larger than the number of arrays of the plurality of laser diodes in the column direction.

5. The light source device of claim 1, wherein
   an arrangement interval of the plurality of mirror surfaces of the first step mirror is the same as an arrangement interval of the plurality of laser diodes in the row direction, and an arrangement interval of the plurality of mirror surfaces of the second step mirror is the same as an arrangement interval of the plurality of laser diodes in the column direction.

6. The light source device of claim 1, wherein a length of the first step mirror in the longitudinal direction is equal to or larger than a numerical value obtained by adding a half value beam diameter of the plurality of parallel beams in the column direction to a product of an arrangement interval and a number obtained by subtracting one from the number of arrays of the plurality of laser diodes in the column direction.

7. The light source device of claim 1, wherein a length of the second step mirror in a longitudinal direction is equal to or larger than a numerical value of a product of the number of arrays of the plurality of laser diodes in the row direction and a width of each of the plurality of mirror surfaces of the first step mirror.

8. The light source device of claim 1, wherein a width of the plurality of mirror surfaces of the first step mirror is 50% or more and 140% or less of a half value beam diameter of the plurality of parallel beams in the row direction, and a width of the plurality of mirror surfaces of the second step mirror is 50% or more and 140% or less of a half value beam diameter of the plurality of parallel beams in the column direction.

9. The light source device of claim 1, wherein a long axis direction of the plurality of parallel beams is disposed in the row direction, and a short axis direction of the plurality of parallel beams is disposed in the column direction.

10. The light source device of claim 1, wherein the first step mirror and the second step mirror have a reflection angle of 45°.

11. The light source device of claim 1, wherein the first step mirror and the second step mirror each have a flat portion having a surface rougher than the plurality of mirror surfaces between the plurality of mirror surfaces and the plurality of mirror surfaces.

* * * * *